June 23, 1925.
G. W. MacKENZIE
1,542,947
LIQUID DISPENSING APPARATUS
Filed Nov. 16, 1923     3 Sheets-Sheet 2
FIG. II.
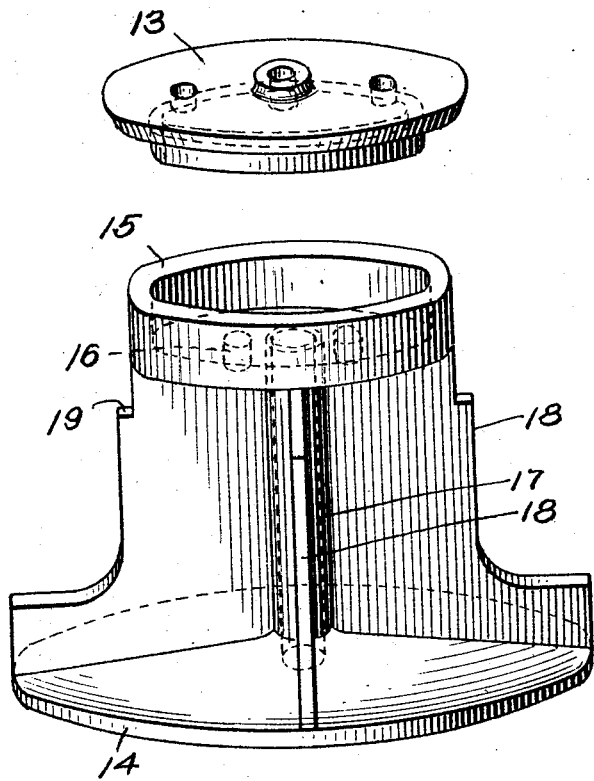
FIG. III.
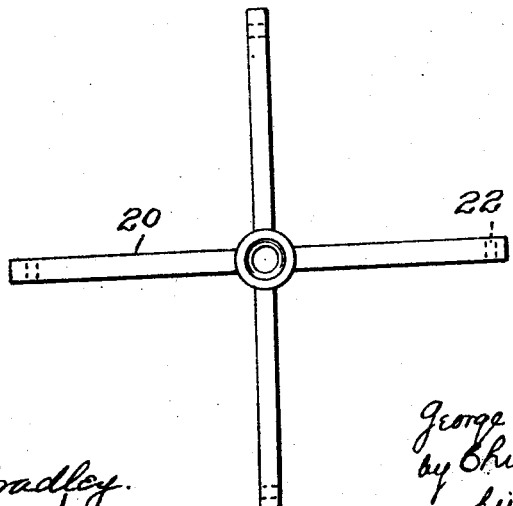
WITNESSES
INVENTOR FIG. IV.
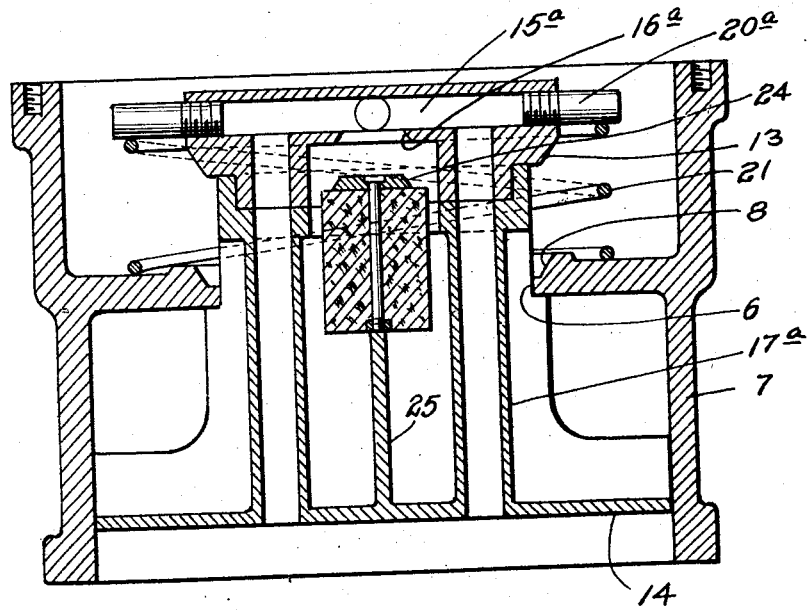
FIG. V.
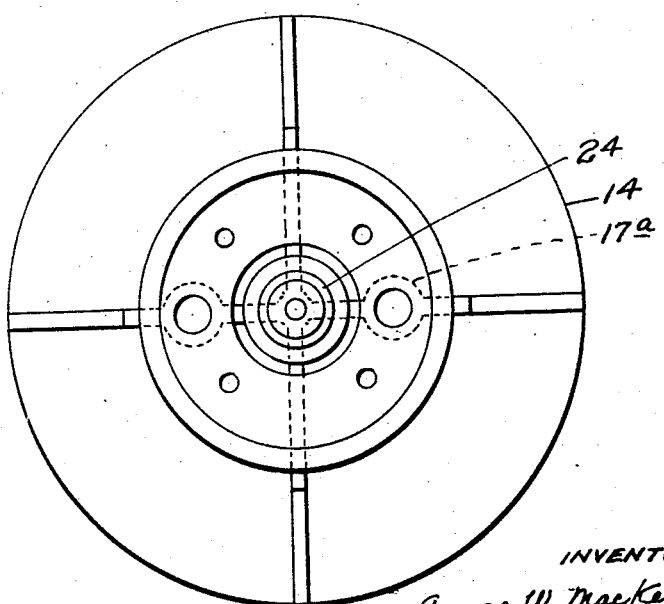

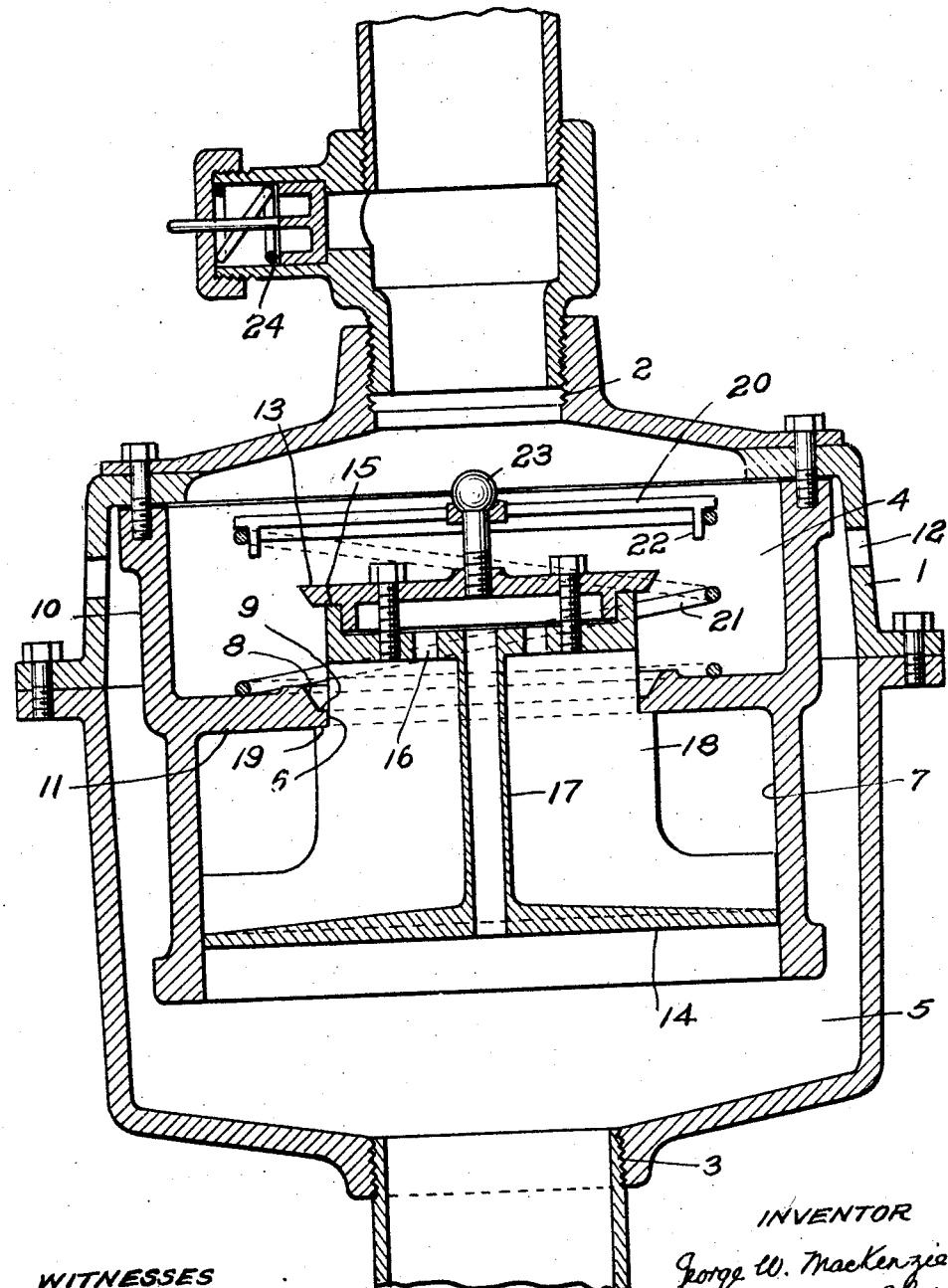

Patented June 23, 1925.

1,542,947

UNITED STATES PATENT OFFICE.

GEORGE W. MACKENZIE, OF BEAVER, PENNSYLVANIA.

LIQUID-DISPENSING APPARATUS.

Application filed November 16, 1923. Serial No. 675,127.

*To all whom it may concern:*

Be it known that I, GEORGE W. MACKENZIE, residing at Beaver, in the county of Beaver and State of Pennsylvania, a citizen of the United States, have invented or discovered certain new and useful Improvements in Liquid-Dispensing Apparatus, of which improvements the following is a specification.

My invention relates to liquid dispensing apparatus and consists in apparatus in which a stream of liquid flowing under gravity through a conduit and to a place of delivery may be segregated as it flows into units of predetermined and constant volume, and such a periodic reciprocation of movable parts may be effected as shall afford evidence, and if desired shall afford record also, of the delivery of the units one by one. The invention finds practical application in gasoline dispensing apparatus and in that application I shall describe it.

In the accompanying drawings Fig. I shows in vertical section gasoline dispensing apparatus embodying my invention; Fig. II shows in perspective certain operative parts, detached; Fig. III shows in plan a certain other detached part; Fig. IV illustrates in the same plane as that of Fig. I a modification in detail of structure; Fig. V is a view in plan from above of one of the parts or elements which in Fig. IV is shown in assembly.

A suitable, essentially cylindrical and vertically standing casing 1 is provided above and below with inlet and outlet taps 2 and 3. It will be understood that at tap 2 a conduit may be connected through which gasoline may flow by gravity to casing 1, at tap 3 connection may be made to a delivery pipe, ordinarily to the flexible delivery hose, familiar at automobile service stations.

The casing 1 is divided internally by a horizontally extending web 11 into inlet and outlet chambers 4 and 5. Through the web opens a central circular orifice 6. About the rim of this orifice is shaped a valve-seat 8 for a poppet-valve 13 which moves vertically and descends to its seat, to effect closure of orifice 6.

Compensation is made for the weight of the valve, and this compensation is most conveniently accomplished by spring tension. The stem of valve 13 extends upwardly, and carries at its upper end a spider 20. Between the arms of this spider and the upper face of the web 11 and surrounding the valve-seat 8 is arranged an extension spring 21. The tension of this spring exerted upwardly upon the depressed valve, countervails against and more or less completely eliminates the effect of the weight of the valve itself.

These are the essential features of the structure. If it be understood that the inlet chamber 4 is full of gasoline supplied under gravity, and that the outlet chamber 5 is empty and open, it will be perceived that valve 13 will be carried to its seat under the head of the flowing liquid. I have discovered that with such a construction the descending valve carried forcibly to its seat will rebound, and that so long as there is an unfailing supply of gasoline to afford head above and free conveyance for the gasoline delivered below, the valve will continue in vertical oscillation, closing and opening again, and I have discovered that the oscillation is governed by law and that with each oscillation there will be delivery of a unit quantity of gasoline and the successive units are of substantially equal value. And I have perceived that, the principle and the law of operation being apprehended, the unit quantity may be determined by a proper proportioning of the parts, and that in this vertically oscillating valve is an indicator of the number of units of predetermined value which pass through the device.

Such being the essential characteristics of the device, it remains to describe the elaborated forms into which I have developed it for service.

The dividing web within casing 1 is particularly shaped as the drawings show it. It is carried by its edges preferably at the upper part of casing 1, and from such point of support it depends into the medial portion of the casing. The peripheral depending parts of the web are indicated at 10 and to the medial horizontal part the numeral 11 is particularly applied. By this construction it will be perceived that the outlet chamber 5 extending upward partially envelopes the inlet chamber 4. In the wall of casing 1, and at an elevated point is formed one or more breathing holes 12.

From the medially and horizontally extending portion 11 of the dividing web and from its nether side depends a cylinder 7. This cylindrical extension is of greater diameter than orifice 6 but is concentrically arranged with respect to orifice 6.

The valve 13 is so proportioned that valve-seat 8 is remote at a small interval from the rim of orifice 6.

The valve 13 is elaborated, as in the ensuing paragraph I shall explain. It becomes one part or element of a measuring member whose structure is clearly shown in Figs. I and II. Of compound character and function, this measuring member is in itself rigid and in the operation of the apparatus moves as a unit.

This measuring member includes an upper poppet valve 13, already described, adapted to be seated upon valve-seat 8, and it includes also a disk 14 which travels as a piston in cylinder 7 and as in operation it passes beyond the lower edge of the cylinder, it forms with the edge of the cylinder a slide-valve. These valve parts 13 and 14 are spaced apart at an interval exceeding the distance from orifice 6 to the lower end of cylinder 7. Accordingly, when one valve is seated the other is open.

The measuring member shown in Fig. II, additionally includes at its upper end a hollow cylindrical box 15, of proper size to fit snugly in orifice 6 in web 11. To this box the valve 13 constitutes a lid, and the lid is bolted to the box, as is clearly illustrated in Fig. I. The joint of the seated lid upon the box is tight. Since the circular valve-seat 8 is as has been said, of greater diameter than orifice 6, it follows that the valve 13 which fills that valve-seat projects peripherally (as appears in Fig. I) beyond the sides of cylindrical box 15, which fits in orifice 6. Breathing holes 16 are formed through the bottom of box 15.

The box 15 with the valve 13 which constitutes its lid is united with valve 14 by a hollow stem 17. Through this stem the space within the box is brought into communication with chamber 5, beneath valve 14. Extending radially from stem 17 are wings 18 which engaging the inner wall of cylindrical extension 7, serve to guide the measuring member in its vertical reciprocation. It has already been explained that the valve-seat 8 is remote from orifice 6 at a brief interval. A narrow margin 9 of the upper face of web 11 is left, rimming orifice 6. Upon this margin 9 as will be perceived the lower face of the plate which constitutes valve 13 and which peripherally overhangs the walls of box 15, is adapted to bear, as the measuring-member descends. The wings 18 are stepped at 19 and, as the measuring member rises, these steps engage the rim of orifice 6 from beneath. Thus the range both of upward and of downward movement of the measuring member is limited by the abutment of rigid parts one upon another, and the poppet-valve 13 particularly is protected from the injurious consequence of hammer upon its seat.

Compensation is made as has been said for the weight of the measuring member. The interengagement of spider 20 with the stem of the measuring member is preferably made in a ball-and-socket joint. As shown, the stem of the measuring member is provided with a ball 23 upon which the spider 20 makes engagement from beneath within a correspondingly spherical socket. By this provision the tension of the spring 21 though exerted to one side of the axial line of the measuring member will have no effect to tip the measuring member, nor to cause it to bind upon the surfaces over which it reciprocates.

The collapsing spring may be guided by means of lugs 22 which extend from spider 20 downward.

Turning now to explanation of the operation of the apparatus, I begin with the parts positioned as they appear in Fig. I. If it be assumed that the cylinder 7 above valve 14 and inlet chamber 4 are full of gasoline, it will be manifest that (chamber 5 being empty and being vented to the air through breathing holes 12), the weight of the gasoline,—the head,—which otherwise would be causing gasoline to flow through breathing holes 16 and hollow stem 17 into outlet chamber 5, is effective (because the valve-member is free and offers substantially no resistance to descent) upon valve 14, to shift the valve-member downward. As the measuring-member descends, the lower rim of box 15 first meets the rim of orifice 6. Although there is no tight seal between these parts, further flow of gasoline into cylinder 7 is substantially cut off, and the measuring-member continues its descent filled to its capacity. And this capacity of the measuring-member is the unit of measure,—it may be a pint, a gallon,—what the machine-builder wills.

The measuring-member continues its descent, the head being effective now upon the valve 13. The effective area of the valve 13 in this continued descent is the area of orifice 6. As the measuring-member continues its descent valve 14 passes beyond the end of cylinder 7, and presently valve 13 closes,—its closure being protected, as has been explained, by the abutment of the lower face of the valve-plate upon the margin 9 of web 11 surrounding orifice 6. The opening of valve 14 effects immediate discharge into chamber 5 of the unit of gasoline previously segregated in the measuring-member, and the discharge is immediate because chamber 5 is at the time empty, and there is free aerial flow through stem 17 and breathing holes 16.

The sudden unburdening of the measuring member accompanied by the sudden arrest of the member in its descent (with closure of valve 13) causes a recoil, and because the measuring member is weightless or substantially so and the discharged unit of gasoline immediately descends leaving the lower end of cylinder 7 free, and in free aerial communication with breathing-holes 12, the measuring-member under recoil springs again to the position shown in Fig. I. Thus the cycle of operation is completed.

So long as gasoline under gravity, and freely exposed above to the air, fills chamber 4, the measuring-member will reciprocate, delivering periodically measured units of gasoline. If the supply fails measuring-member will descend with the last remnant and valve 13 will close.

The pulsation imparted by operation to the body of gasoline above web 11 may be employed to operate piston 24, shifting it against spring tension within a cylinder, and the pulsations of this piston may be recorded by appropriate apparatus. Manifestly the mere reciprocation of the measuring member itself may suffice to indicate and to effect record of pulsations.

The cylinder 7 is made larger than the orifice 6 merely to intensify the downward thrust, and consequently the range of recoil, of the measuring member.

It is apparent that a second measuring member constructed like the one shown and described might operate in a second orifice 6 arranged in the same web 11 and encircled above by a second valve-seat 8 and encircled below by a second cylinder 7. And so a third might be provided. Each measuring member would operate as an independent unit.

Manifestly the apparatus is applicable in dispensing any liquid.

I turn now to the modification shown in Figures IV and V. This modification has wholly to do with the valve 13 and its associated parts. As in the form shown in Figure I the dependent cylinder 7 is provided, and reciprocable within it and beyond it is the disk 14. The valve parts 13 and 14 are integral and move up and down united together, as they do in the form shown in Figure I, constituting an integral measuring member. The cylindrical box 15ª is in this case formed wholly within the body of valve 13. The bodies of valves 13 and 14 are bolted together, as in the form shown in Figure I. Figure V shows the valve body 14 detached. Instead of a central hollow stem bringing the chamber 15ª into communication with the space beneath valve member 14, two hollow stems 17ª establish such communication. It will be understood that these two stems 17ª extend longitudinally within the cylindrical space but do not otherwise obstruct the space within the cylinder. The space within the cylinder is open and continuous around and between them. There is a single central breathing hole 16ª, opening from the space within the cylinder to the box 15ª and thence through the stems 17ª to the chamber 5, and this breathing hole 16ª constitutes a seat for a float valve 24, movable vertically within the measuring member and closing upwardly. The float valve 24 is in Figure IV shown in the position which it occupies when the apparatus is empty, resting by gravity upon a post 25 which rises centrally from the disk 14. It will be understood that the float valve will be lifted freely from this post by the tide of gasoline which in the operation of the apparatus rises in cylinder 7.

It has been explained in connection with the form shown in Figure I that as gasoline pours from chamber 4 through orifice 6 and into the dependent cylinder 7 (the valve member 14 being raised) the displaced air is escaping through breathing holes 16, hollow stem 17, and breathing hole 12. Turning to Figure IV it will be perceived that as this pouring in of gasoline is going on, the displaced air is escaping through breathing hole 16ª and hollow stems 17ª. And it will further be perceived that as the measuring member descends and in its descent fills, the float valve 24 will presently be brought to its seat. This will occur when or slightly before valve 13 comes to its seat and when the valve member 14 passes beyond the end of the dependent cylinder 7. No guiding means for the valve 24 are here shown, and to that extent the drawing is diagrammatic, but the guidance of float valves is well known to the art. The escape of liquid from the measuring member will allow air to rise through the stems 17ª and to enter through the breathing hole 16ª into the chamber within the measuring member, the float valve 24 falling away with the recession of the gasoline and not in any way impeding the entrance of the air to take the place of the escaping gasoline. As the measuring member, now unloaded, rebounds and rises again there is free flow of air from the chamber within the measuring member through breathing hole 16ª and hollow stems 17ª to the open air.

The advantage of the form of measuring member shown in Figures IV and V over that shown in Figures I and II is that in the structure of Figure IV and V the entire head exerted by the body of liquid above is exerted upon the measuring member without diminution consequent upon the chance escape of liquid through the breathing hole, and this is a feature of particular value where the head exerted through the liquid above is relatively small in amount. That is to say, the structure is, for the reason explained, adapted to give greater accuracy under low pressure conditions.

Figure IV shows one further modification in that the spider of Figures I and III is dispensed with, and in place there are arms. 20ª extending radially from the body of valve 13 itself and integral with the body of the valve upon which the spring 21 bears from beneath upwardly. Figure IV of the drawings will not be misunderstood. These elements 20ª are not sections of open pipe but are merely radial arms. The chamber 15ª is a closed chamber. There is no communication from chamber 15ª through these arms 20ª.

I claim as my invention:

1. In liquid-dispensing apparatus the combination of a liquid container provided with an orifice, a valve arranged within the container opposite said orifice and reciprocable to and from a position of closure upon said orifice, and yielding means constantly exerted upon said valve and tending constantly to sustain it at an interval above said orifice.

2. In liquid-dispensing apparatus the combination with a liquid container having a vertically extending passageway opening from the bottom of said container, and a measuring member reciprocable within a limited range in said passageway, and means for rendering ineffective the weight of said measuring member the said measuring member forming together with the passageway a receptacle which when the member is raised is open above and closed below and when the member is depressed is closed above and open below.

3. In liquid-dispensing apparatus the combination with a liquid-container having a vertically extending passageway opening from its bottom, of a measuring member including upper and lower disks of which the upper constitutes a poppet valve at the top and the lower a slide valve at the bottom of said passageway, the said member being reciprocable between an elevated position in which the upper valve is open and the lower closed and a depressed position in which the upper valve is closed and the lower open, and means for rendering ineffective the weight of said measuring member.

4. In liquid-dispensing apparatus the combination with a liquid-container having a vertically extending cylindrical passageway opening from its bottom, the lower portion of said cylindrical passageway being of greater diameter than the upper, of a measuring member including upper and lower disks, of which the upper constitutes a poppet valve upon the upper end of the cylindrical passageway, and the other a piston valve sliding in the lower portion of said passageway, said member being reciprocable between a raised position in which the lower valve is closed and the upper open, and a depressed position in which the upper valve is closed and the lower open, and means for rendering ineffective the weight of said measuring member, said member when in raised position and filled being movable by gravity to depressed position and, on reaching depressed position and automatically emptied, recoiling to raised position.

5. In liquid-dispensing apparatus the combination with a liquid-container, having a vertically extending passageway opening from its bottom downward, a measuring member, weight-equalizing means tending to sustain said measuring member in elevated position within said passageway, said measuring member being movable within said passageway between two positions: a raised position in which in cooperation with the passageway walls it forms a liquid-receptacle open above and closed below, and a lowered position in which in cooperation with the passageway walls it forms a receptacle closed above and open below.

6. In liquid-dispensing apparatus the combination with a liquid-container having a cylindrical passageway opening downwardly from its bottom and a measuring member reciprocable in said pasageway, said measuring member including an upper cylindrical box ported beneath and provided with a lid with overhanging edges, said box adapted to slide within said passageway and said lid adapted to constitute a poppet valve upon the upper end of said passageway, said measuring member including also a lower disk adapted to constitute a piston head within said passageway and to act as a slide valve in passing beyond the end of and in returning into the end of said passageway, the said upper box and lower disk being united upon a hollow stem through which there is communication between the space within the box and the space beneath the lower disk, the lid of the box and the lower disk being spaced apart at a distance exceeding the length of said passageway.

7. In liquid-measuring apparatus the combination of a chamber having a passageway opening vertically downward from the bottom of said chamber, a measuring member in said chamber adapted to receive and deliver measured units of liquid and reciprocable under hydrostatic pressure between elevated and receiving position and lowered and discharging position, and a detector arranged in the wall of the casing and exposed to the pressure within the casing and movable under accessions of pressure against a yielding force.

8. In liquid-dispensing apparatus the combination of a casing, a web within the casing dividing the space within into an upper inlet chamber and a lower outlet chamber, the outlet chamber in its upper part surrounding said inlet chamber and the casing wall at that part being provided with a breathing hole opening to the outlet chamber, the said web being ported, a cylinder depending from said web, surrounding the port therein, and opening to the outlet chamber, and a measuring element reciprocable in said cylinder between an elevated position in which cooperating with the cylinder walls it forms an upwardly opening liquid receptacle and a lowered position in which cooperating with the cylinder walls it forms a downwardly opening liquid receptacle.

9. In liquid-dispensing apparatus the combination with a liquid container having a cylindrical passageway opening downwardly from its bottom and a measuring member reciprocable in said passageway, said measuring member including upper and lower valve members and an upper box ported both to the space between the valves and to the space below the lower valves, and a float valve borne by said measuring member and adapted to be seated in the port through which said box is ported to the space between the two valves first named.

10. In a liquid-dispensing apparatus in combination with the inlet chamber 4, and the cylinder 7 opening from the bottom of chamber 4, of the measuring element comprising the valve disk 13 and the valve disk 14 sustained by the spring 21 and reciprocable in said cylinder, substantially as described.

In testimony whereof I have hereunto set my hand.

GEORGE W. MacKENZIE.

Witnesses:
  DAVID STEWART,
  N. R. POE.